US011948497B2

(12) United States Patent
Lin et al.

(10) Patent No.: US 11,948,497 B2
(45) Date of Patent: Apr. 2, 2024

(54) DISPLAY DEVICE AND DRIVING METHOD THEREOF

(71) Applicant: Lextar Electronics Corporation, Hsinchu (TW)

(72) Inventors: Chih-Hao Lin, Hsinchu (TW); Chien-Nan Yeh, Hsinchu (TW); Jo-Hsiang Chen, Hsinchu (TW); Shih-Lun Lai, Hsinchu (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 17/446,459

(22) Filed: Aug. 30, 2021

(65) Prior Publication Data

US 2022/0398973 A1 Dec. 15, 2022

(30) Foreign Application Priority Data

Jun. 10, 2021 (CN) ......................... 202110646060.0

(51) Int. Cl.

*G09G 3/20* (2006.01)
*C09K 11/02* (2006.01)
*G09G 3/32* (2016.01)
*H10K 59/35* (2023.01)
*H10K 59/38* (2023.01)

(52) U.S. Cl.

CPC ............. *G09G 3/32* (2013.01); *G09G 3/2014* (2013.01); *G09G 3/2074* (2013.01); *G09G 2320/0242* (2013.01); *G09G 2330/12* (2013.01)

(58) Field of Classification Search

CPC ......... G09G 3/32; G09G 3/2014–2074; G09G 2320/0242; G09G 2330/12

See application file for complete search history.

(56) References Cited

U.S. PATENT DOCUMENTS

| | | | | |
|---|---|---|---|---|
| 10,764,975 B2 | | 9/2020 | Valentine | |
| 2007/0075627 A1* | | 4/2007 | Kimura | H10K 59/351 313/506 |
| 2008/0218071 A1* | | 9/2008 | Kobayashi | H10K 59/38 313/506 |
| 2014/0267456 A1* | | 9/2014 | Ando | G09G 3/3413 345/102 |
| 2016/0248031 A1* | | 8/2016 | Seo | C09K 11/02 |
| 2017/0188427 A1 | | 6/2017 | Cok et al. | |
| 2018/0285619 A1* | | 10/2018 | Kim | G09G 3/3275 |
| 2019/0073944 A1 | | 3/2019 | Li | |

(Continued)

*Primary Examiner* — Lin Li

(74) *Attorney, Agent, or Firm* — CKC & Partners Co., LLC

(57) ABSTRACT

A display device includes a plurality of sub-pixels. The sub-pixels include a first sub-pixel and a second sub-pixel. The first sub-pixel includes a first light emitting element and a first control circuit. The first control circuit is configured to provide a first driving current to the first light emitting element. The second sub-pixel includes a second light emitting element and a second control circuit. The second control circuit is configured to provide a second driving current to the second light emitting element. The first control circuit and the second control circuit are configured to differently control pulse amplitude of the first driving current and pulse amplitude of the second driving current, such that both of the first light emitting element and the second light emitting element emit at a target wavelength or a color point range (e.g. +/−1.5~2 nm).

10 Claims, 14 Drawing Sheets

(56) References Cited

U.S. PATENT DOCUMENTS

| | | | | |
|---|---|---|---|---|
| 2019/0371232 | A1* | 12/2019 | Kim | G09G 3/2011 |
| 2020/0312216 | A1* | 10/2020 | Kim | G09G 3/32 |
| 2021/0256898 | A1* | 8/2021 | Kim | G09G 3/2003 |
| 2022/0328716 | A1* | 10/2022 | Yang | H01L 33/0095 |

* cited by examiner

DISPLAY DEVICE AND DRIVING METHOD THEREOF

CROSS-REFERENCE TO RELATED APPLICATION

This application claims priority to China Application Serial Number 202110646060.0, filed Jun. 10, 2021, which is herein incorporated by reference in its entirety.

BACKGROUND

Field of Invention

The present invention relates to a display device. More particularly, the present invention relates to a display device capable for adjusting peak wavelengths of light emitting elements.

Description of Related Art

In nowadays techniques of display devices, since the chip size of light emitting elements is gradually decreased, the difficulty for detecting the variation of the light emitting elements is greatly increased, which may cause problems such as color deviation or reduced color fidelity of the display device. Therefore, how to decrease the chromatic aberration and increase the color fidelity is important issue in this techniques field.

SUMMARY

One embodiment of the present disclosure is to provide a display device. The display device includes a plurality of sub-pixels. The sub-pixels include a first sub-pixel and a second sub-pixel. The first sub-pixel includes a first light emitting element and a first control circuit. The first control circuit is configured to provide a first driving current to the first light emitting element. The second sub-pixel includes a second light emitting element and a second control circuit. The second control circuit is configured to provide a second driving current to the second light emitting element. The first control circuit and the second control circuit are configured to differently control pulse amplitude of the first driving current and pulse amplitude of the second driving current, such that both of the first light emitting element and the second light emitting element emit at a target wavelength or a color point range.

Another embodiment of the present disclosure is to provide a display device. The display device includes a plurality of pixels. One of the pixels includes a first control circuit and a first sub-pixel with a first light emitting element. Another of the pixels includes a second control circuit and a second sub-pixel with a second light emitting element. The first control circuit is configured to provide a first driving current to the first light emitting element. The second control circuit is configured to provide a second driving current to the second light emitting element. The first control circuit and the second control circuit are configured to differently control pulse amplitude of the first driving current and pulse amplitude of the second driving current, such that the first light emitting element and first light emitting element emit at a target wavelength or a color point range.

The other embodiment of the present disclosure is to provide a driving method for operating a display device. The display device includes a plurality of sub-pixels. The sub-pixels comprise a first sub-pixel with a first light emitting element and a second sub-pixel with a second light emitting element. The driving method includes the following steps. A first driving current is provided to the first light emitting element. A second driving current is provided to the second light emitting element. Pulse amplitude of the first driving current and pulse amplitude of the second driving current are controlled differently, such that both of the first light emitting element and the second light emitting element emit at a target wavelength or in a color point range.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
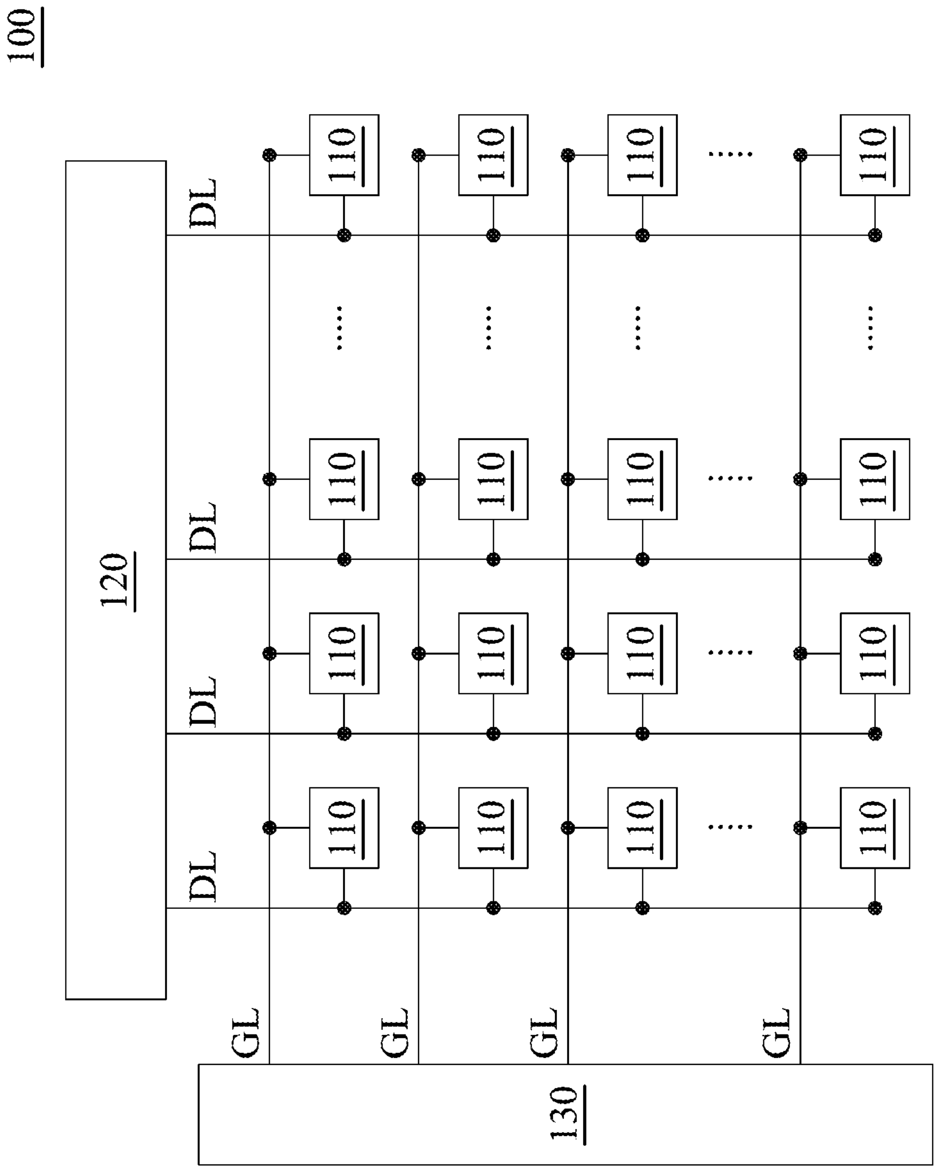
FIG. 1 is a schematic diagram of a display device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
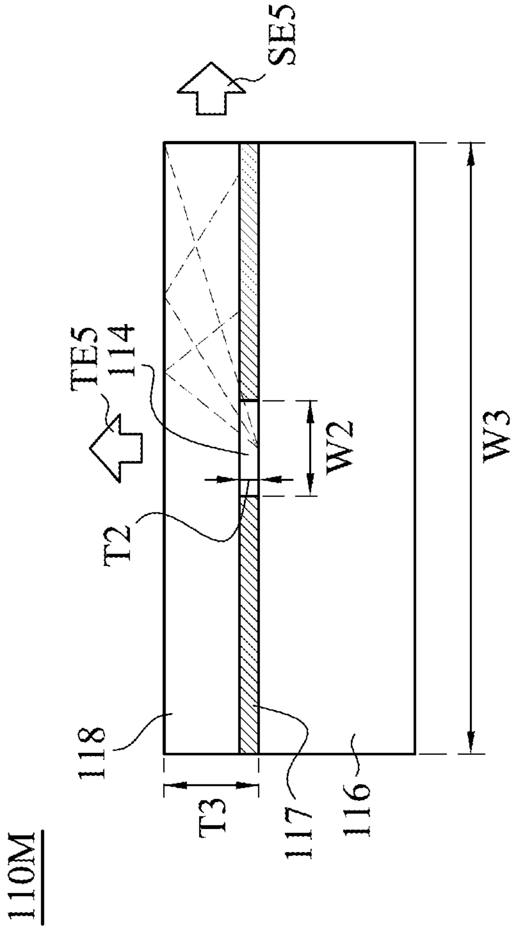
FIG. 2 is a schematic diagram of a cross-sectional view of a light emitting diode package of one of sub-pixels in FIG. 1.
Figure 3:
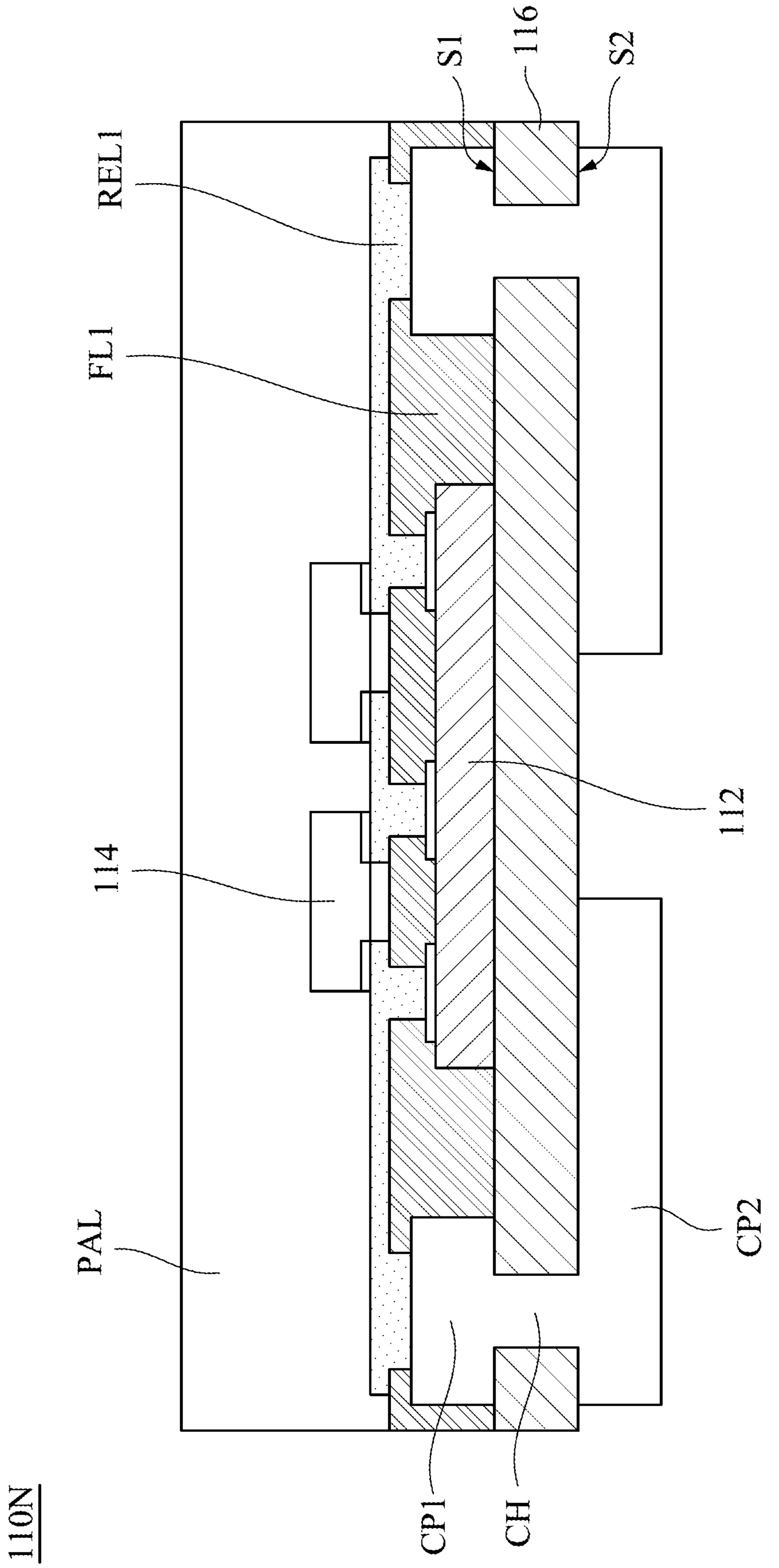
FIG. 3 is a schematic diagram of a cross-sectional view of a light emitting diode package of one of sub-pixels in FIG. 1.
Figure 4:
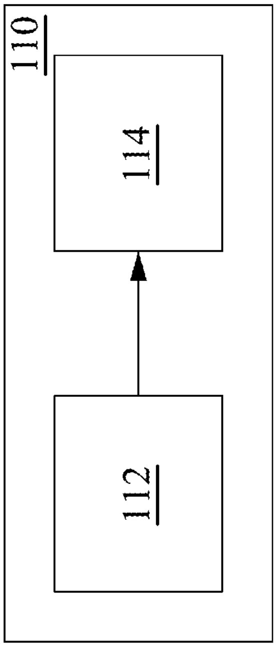
FIG. 4 is a functional block diagram of one of sub-pixels in the display device in FIG. 1.

Reference is made to FIG. 1-FIG. 4. FIG. 1 is a schematic diagram of a display device 100 in accordance with some embodiments of the present disclosure. FIG. 2 is a schematic diagram of a cross-sectional view of a light emitting diode package 110M of one of sub-pixels 110 in FIG. 1. FIG. 3 is a schematic diagram of a cross-sectional view of a light emitting diode package 110N of one of sub-pixels 110 in FIG. 1. FIG. 4 is a functional block diagram of one of sub-pixels 110 in the display device in FIG. 1.

As shown in FIG. 1, the display device 100 includes a gate driver 130, a data driver 120, multiple of sub-pixels 110, multiple of data lines DL and multiple of gate lines GL. The data driver 120 is electrically coupled to the data lines DL. The sub-pixels 110 in the same column are electrically coupled to the data driver 120 through one of the data lines DL. The sub-pixels 110 in the same row are electrically coupled to the gate driver 130 through one of the gate lines GL.

The sub-pixels 110 can be implemented by red sub-pixels, green sub-pixels and blue sub-pixels arranged alternately. For examples, the sub-pixels 110 from the first column to the third column sequentially are red sub-pixels, green sub-pixels and blue sub-pixels.

Reference is made to FIG. 1 and FIG. 2. The sub-pixels 110 can be implemented by light emitting diode sub-pixels. In some embodiments, the adjacent red sub-pixel, green sub-pixel and blue sub-pixel in the sub-pixels 110 can be implemented by one light emitting diode package 110M. The light emitting diode package 110M includes a substrate 116, a transparent material layer 118, at least one light emitting element 114, a black material layer 117. The at least one light emitting element 114 is electrically coupled to a top surface of the substrate 116. The at least one light emitting element 114 can be implemented by micro light emitting diode chip. In additional, aforesaid micro light emitting diode chip can be red, green or blue light emitting diode chip.

To be noted that, FIG. 2 only illustrates one light emitting element 114 for examples. In some embodiments, the light emitting diode package 110M can includes more light emitting elements (not shown in FIG. 2). For example, one light emitting diode package 110M can be disposed three light emitting elements. The aforesaid three light emitting elements can be implemented by red, green and blue light emitting diode chip, on order to implement the light emitting element 114 of each of the adjacent red sub-pixel, green sub-pixel and blue sub-pixel in the sub-pixels 110.

In some embodiments, the light emitting diode package 110M includes more control circuits (not shown on FIG. 2). The aforesaid control circuits are configured to respectively control the light emitting element 114 of each of the adjacent red sub-pixel, green sub-pixel and blue sub-pixel in the sub-pixels 110. In other embodiments, the control circuits configured to respectively control the light emitting element 114 of each of the adjacent red sub-pixel, green sub-pixel and blue sub-pixel in the sub-pixels 110 can be disposed outside the light emitting diode package 110M.

In some embodiments, the light emitting element 114 has a width W2 from 1 micrometer to 100 micrometer, such as 1-5 micrometer, 5-10 micrometer, 10-25 micrometer or 25-50 micrometer, and a thickness T2 is less than 10 micrometer. In some embodiments, the light emitting element 114 enable the light emitting diode package 110M to emit at a ratio, 0.4%, of side emission over top emission.

In some embodiments, the light emitting element 116 has a width W3 from 100 micrometer to 1000 micrometer. The substrate 116 is used to package the light emitting element 114 having a width W2 ranging from 1 micrometer to 100 micrometers and a thickness T2 smaller than 10 micrometers. The black material layer 117 is configured to cover a top surface of the substrate 116 and expose a light-emitting surface of the light emitting element 114. The black material layer 117 preferably has a thickness less than 10 micrometers. In the present disclosure, the light emitting element 114 has a thickness substantially equal to a thickness of the black material layer 117. However, it is not intend to limit the present disclosure.

In some embodiment, the transparent material layer 118 covers the light emitting element 114 and the black material layer 117. The transparent material layer 118 has a thickness T3, 50 micrometers. A ratio of the width of the substrate over the thickness of the transparent material layer is equal to or greater than 4. The substrate 116 can be implemented by a printed circuit board, a sapphire substrate or a glass substrate.

Reference is made to FIG. 1 and FIG. 3. In other embodiments, the light emitting element and the control of each of the adjacent red sub-pixel, green sub-pixel and blue sub-pixel in the sub-pixels 110 can be implemented by the light emitting diode package 110N. The light emitting diode package 110N includes a substrate 116, a conductive via CH, a first conductive pad CP1, a second conductive pad CP2, a control circuit 112, a first flat layer FL1, a first redistribution layer REL1, a light emitting element 114 and an encapsulating layer PAL. To be specific, the substrate 116 has a first surface S1 and a second surface S2 opposite thereto. In some embodiments, the substrate 116 may be a rigid printed circuit board, a high thermal conductivity aluminum substrate, a flexible printed circuit board, a flexible substrate, a glass substrate, a metal composite material board, a ceramic substrate, or a semiconductor substrate with functional components such as transistors or integrated circuits (ICs).

To be noted that, FIG. 3 only illustrates two light emitting elements 114 and one control circuit 112 for examples. In some embodiment, one light emitting diode package 110N can includes more light emitting elements and the corresponding control circuits. For examples, three light emitting elements 114 and three control circuits 112 can be disposed in one light emitting diode package 110N. The aforesaid three control circuits 112 respectively control the three light emitting elements 114 to perform expected functions. The three light emitting elements 114 are red, green and blue light emitting diodes. However, it is not intend to limit the present disclosure. For examples, one light emitting diode package 110N may include more light emitting elements 114, such as 6, 9 or other number of the light emitting elements 114. In some embodiments, the control circuit 112 is disposed on the first surface S1 of the substrate 116, as shown in FIG. 3. The control circuit 112 in the present disclosure may be such as a micro-driving chip with a size ranging from about 1 μm to 300 μm. Moreover, the size of the micro-driving chip may be such as 10 um, 30 um, 50 um, 70 um, 100 um, 120 um, 150 um, 200 um, or 250 um.

Reference is made to FIG. 4. FIG. 4 is a functional block diagram of one of sub-pixels 110 in the display device 100 in FIG. 1. As shown in FIG. 4, one of sub-pixels 110 includes a control circuit 112 and a light emitting element 114. The control circuit 112 is electrically coupled to the light emitting element 114, and the control circuit 112 is configured to drive the light emitting element 114. In some embodiments, at least one of the aforementioned sub-pixels 110 includes the control circuit 112 and the light emitting element 114. In other embodiments, each of the aforementioned sub-pixels 110 includes the control circuit 112 and the light emitting element 114.

In some embodiments, the light emitting element 114 can be realized as micro light emitting diode, light emitting diode or other light emitting elements. If the light emitting element 114 is implemented by the micro light emitting diode, the light emitting element 114 can be transferred from micro light emitting diode wafer. In some embodiments, the control circuit 112 can be realized as control circuit, application specific integrated circuit or other circuits.

The control circuit 112 is configured to provide a driving current to drive the light emitting element 114 to emit light. In other word, the emission brightness of the light emitting element 114 is determined by the amplitude and width of the driving current provided by the control circuit 112. For better understanding, how to determine the emission brightness of the light emitting element 114 according to the amplitude and width of the driving current will be described in the following paragraphs.

Figure 5B:
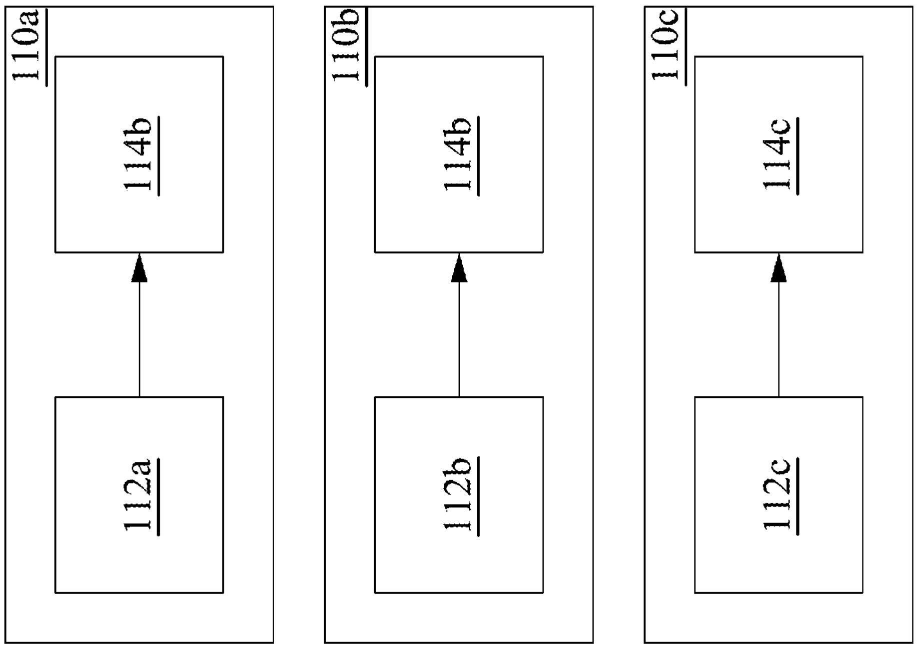
FIG. 5B is a functional block diagram of the sub-pixels in FIG. 5A in accordance with some embodiments of the present disclosure.
Figure 5A:
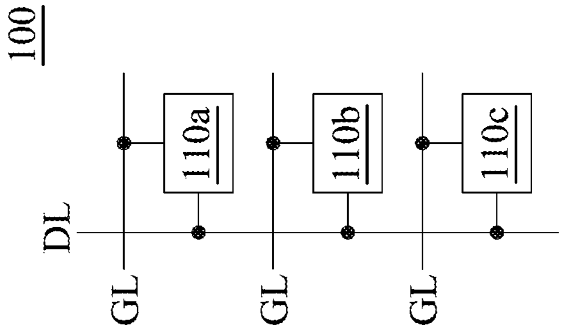
FIG. 5A is a schematic diagram of adjacent sub-pixels in the display device in FIG. 1 in accordance with some embodiments of the present disclosure.

Reference is made to FIG. 5A. FIG. 5A is a schematic diagram of adjacent sub-pixels in the display device 100 in FIG. 1 in accordance with some embodiments of the present disclosure. As shown in FIG. 5A, sub-pixels 110*a*, 110*b* and 110*c* are coupled to the same data line DL, and the sub-pixels 110*a*, 110*b* and 110*c* can be indicated to the sub-pixels 110 in FIG. 4. In some embodiments, the sub-pixels 110*a*, 110*b* and 110*c* can be realized as any sub-pixels adjacent to each other with the same color.

Reference is also made to FIG. 5B. FIG. 5B is a functional block diagram of the sub-pixels 110*a*, 110*b* and 110*c* in FIG. 5A in accordance with some embodiments of the present disclosure. As shown in FIG. 5B, the sub-pixel 110*a* includes a first control circuit 112*a* and a first light emitting element 114*a*. The sub-pixel 110*b* includes a second control circuit 112*b* and a second light emitting element 114*b*. The sub-pixel 110*c* includes a third control circuit 112*c* and a third light emitting element 114*c*.

In some embodiments, each of the first light emitting element 114*a*, the second light emitting element 114*b* and the third light emitting element 114*c* can be realized as a micro light emitting diode. The said micro light emitting diode has a width with a range from 1 micrometer to 100 micrometers.

Figure 6:
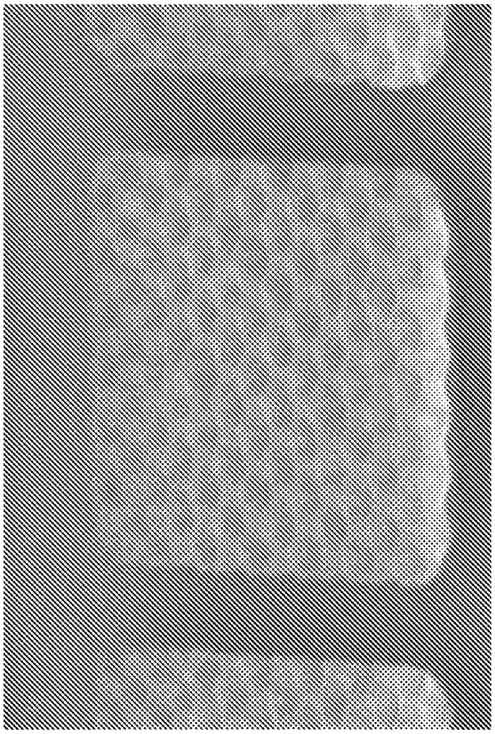
FIG. 6 is a schematic diagram of an emission surface of the light emitting element in FIG. 5B in accordance with some embodiments of the present disclosure.

Reference is made to FIG. 6. FIG. 6 is a schematic diagram of an emission surface of the light emitting element in FIG. 5B in accordance with some embodiments of the present disclosure. The width of aforesaid micro light emitting diode can be 10, 30, 50, 70 or 100 micrometers. The micro light emitting diode does not equipped with growth substrate, such as the sapphire substrate or patterned sapphire substrate. The aforesaid micro light emitting diode can be equipped with the laser-lift-off rough pattern to enhance light extraction. The laser-lift-off rough pattern is formed on a light emitting surface by applying a laser lift off process to a sapphire substrate or patterned sapphire substrate. As a result, the rough pattern can be formed on the light emitting surface of the micro light emitting diode, as shown in FIG. 6.

Compare to the general light emitting diode, the size of the micro light emitting diode is much smaller. Therefore, in the manufacturing process of the micro light emitting diode, the wavelength variations of each micro light emitting diodes on the wafer is hard to determined, to select and eliminate the defective micro light emitting diodes. The aforesaid wavelength variations can be realized as differences between a target wavelength (a expect wavelength) and the peak wavelengths of the micro light emitting diodes under the same driving current flowing through the micro light emitting diodes. Generally, even a wavelength difference is only 3 nm between two adjacent light emitting diodes (e.g., the peak wavelengths of the two adjacent light emitting diodes are respectively 530 nm and 527 nm), the wavelength difference of 3 nm can be perceivably by human visual. Therefore, since the defective micro light emitting diodes are hard to select and eliminate from the wafer, the wavelength difference between the adjacent light emitting diodes is need to be decreased, and the color fidelity of the display is need to be increased, the peak wavelengths of the micro light emitting diodes can be detected, after the micro light emitting diodes are mounted on the circuit substrate (array), by other optic instrument (e.g. integrating sphere).

In some embodiments, after the manufacturing process of the micro light emitting diodes (such as the light emitting element 114) and before transferring the micro light emitting diodes from the wafer, each of the micro light emitting diodes may include a semiconductor stack and a supporting breakpoint. When the carrier substrate (e.g. a sapphire substrate) is removed by breaking the supporting breakpoint, the semiconductor stack can be separated from the carrier substrate.

In one embodiment, the supporting breakpoint is disposed between the light emitting surface and the carrier substrate. In another embodiment, the supporting breakpoint is disposed between a surface opposite to the light emitting surface and the carrier substrate. In the other embodiment, the supporting breakpoint is disposed on a surface adjacent to the light emitting surface.

Figure 7:
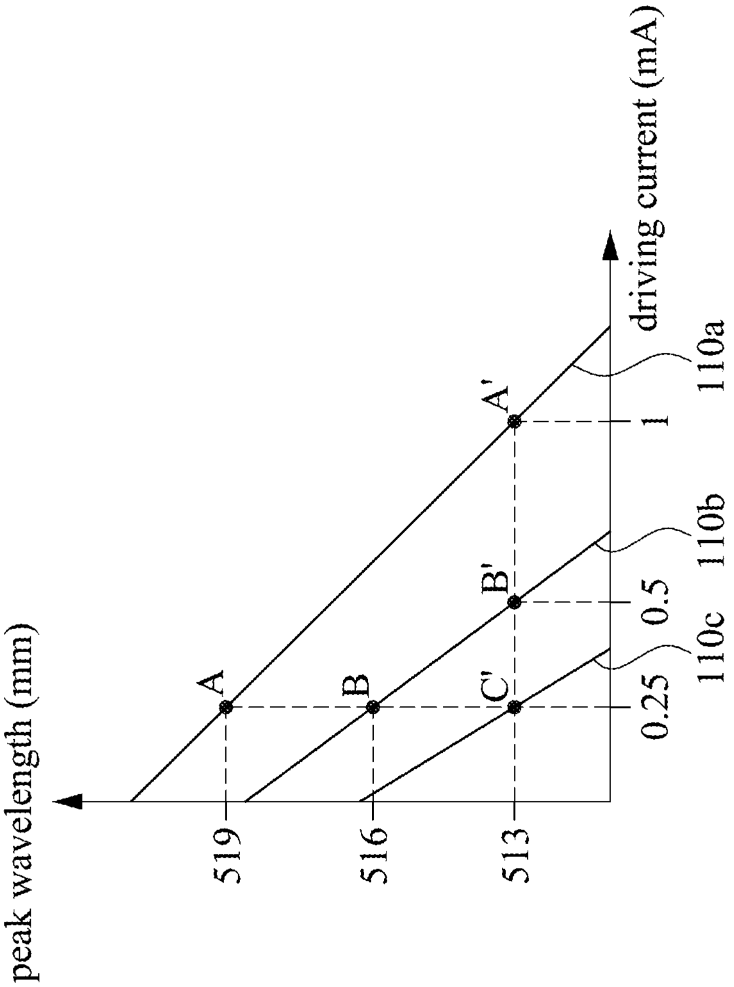
FIG. 7 is a schematic diagram of a graph of peak wavelength over driving current for the light emitting elements in sub-pixels in FIG. 5B in accordance with some embodiments of the present disclosure.

Reference is also made to FIG. 7. FIG. 7 is a schematic diagram of a graph of peak wavelength over driving current for the light emitting elements in sub-pixels 110*a*, 110*b* and 110*c* in FIG. 5B in accordance with some embodiments of the present disclosure. As shown in FIG. 7, when the value (pulse amplitude) of the driving currents applied to each light emitting elements in the sub-pixels 110*a*, 110*b* and 110*c* are at the same test value (e.g. 0.25 mA), the light emitting elements in the sub-pixels 110*a*, 110*b* and 110*c* may have the different peak wavelengths, such 519 nm, 516 nm and 513 nm, as the points A, B and C' shown in FIG. 7.

To decrease the wavelength difference between the adjacent light emitting elements with the same color, how to adjust the wavelengths of the light emitting elements in the sub-pixels 110*a* 110*b* and 110*c* to a target wavelength will be described in the following embodiments. For better understanding, the light emitting elements in the sub-pixel 110*c* is supposed to have the target wavelength, and the target wavelength of 513 nm in the following embodiments is merely for example. To adjust the adjacent light emitting elements to have the same target wavelength, the peak wavelength of the light emitting elements in the sub-pixels 110*a* 110*b* needs to be adjusted from 519 nm and 516 nm to 513 nm.

Figure 8A:
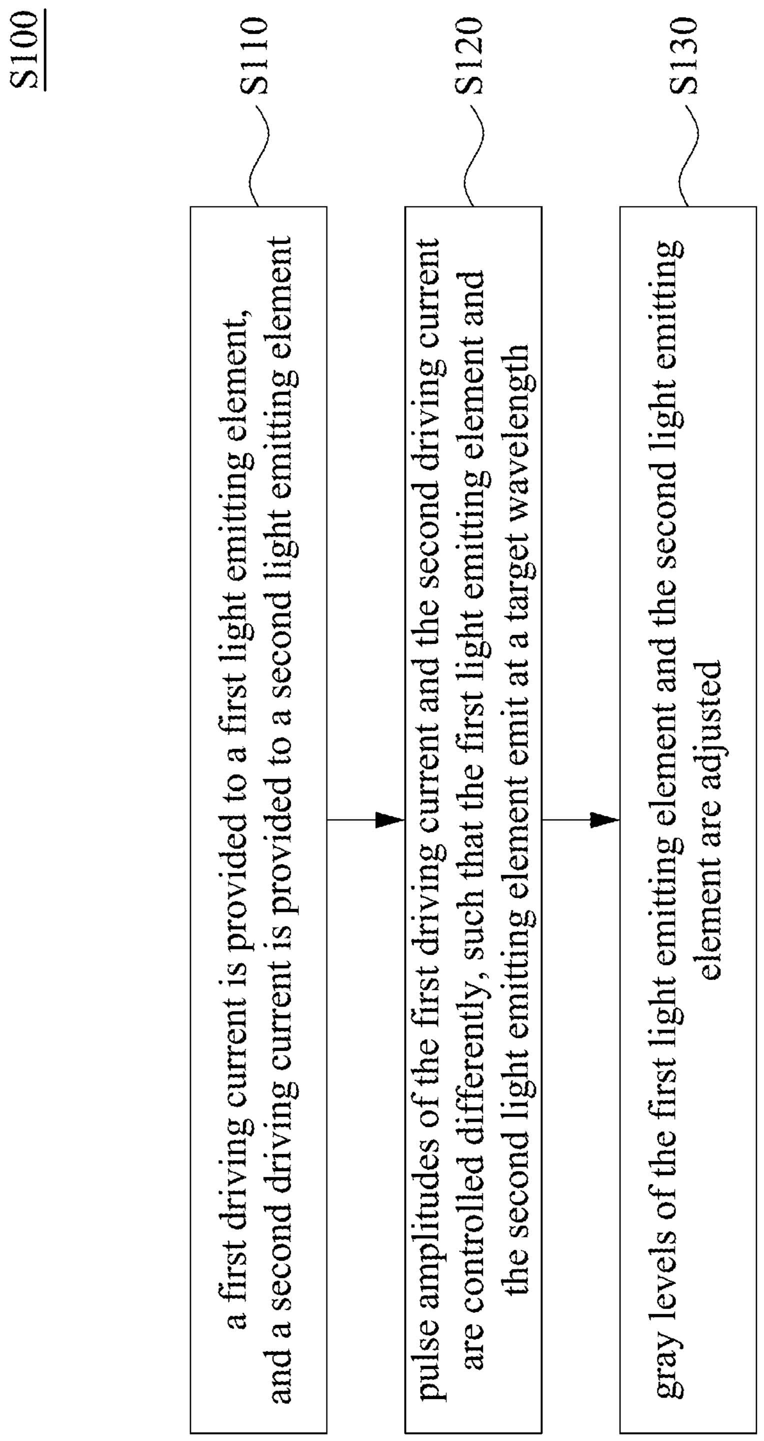
FIG. 8A is a flowing chart of a driving method in accordance with some embodiments of the present disclosure.
Figure 8B:
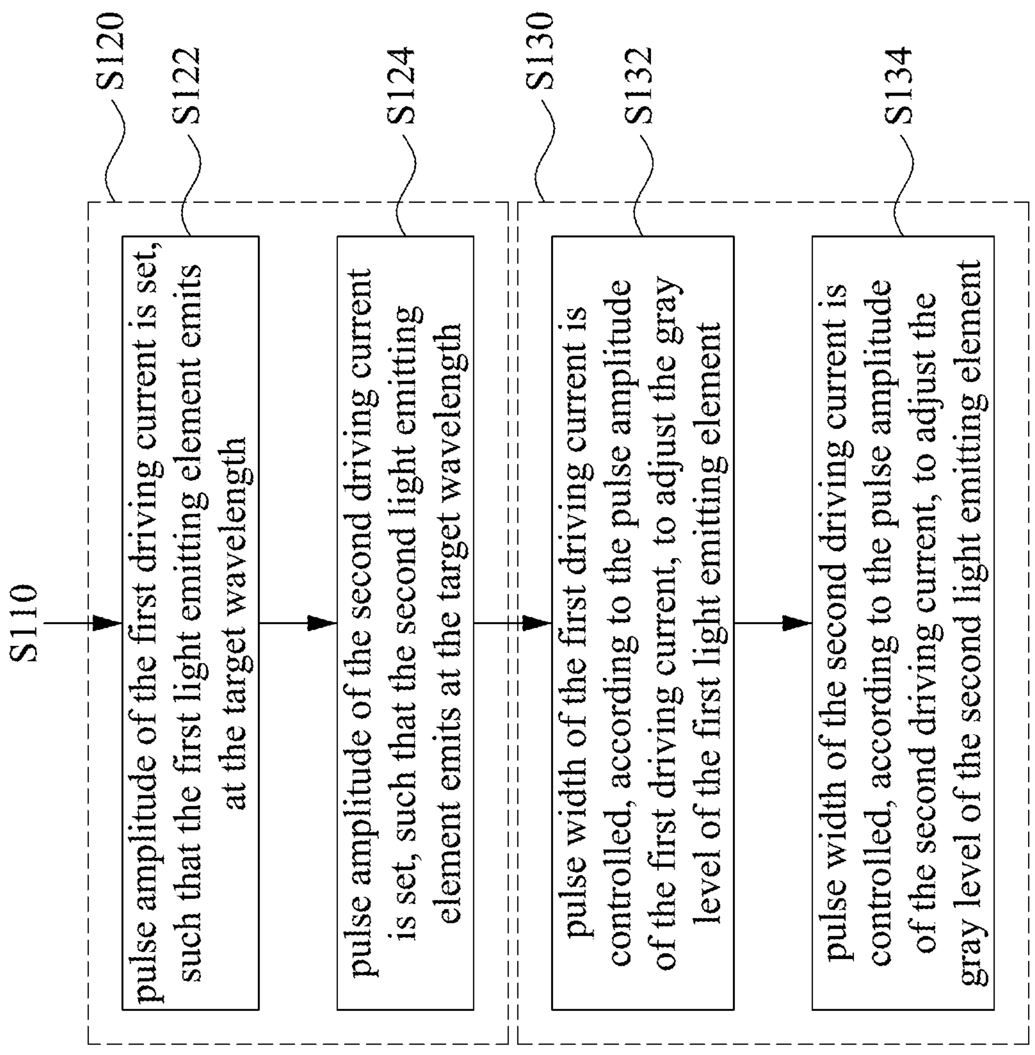
FIG. 8B is a flowing chart of two steps of the driving method in FIG. 8A in accordance with some embodiments of the present disclosure.

Reference is made to FIG. 8A and FIG. 8B. FIG. 8A is a flowing chart of a driving method S100 in accordance with some embodiments of the present disclosure. The driving method S100 includes steps S110, S120 and S130. FIG. 8B is a flowing chart of two steps S120 and S130 of the driving method S100 in FIG. 8A in accordance with some embodiments of the present disclosure.

In step S110, a first driving current is provided to a first light emitting element, and a second driving current is provided to a second light emitting element. For example, a first driving current is provided to a first light emitting element 114*a* in the sub-pixel 110*a* by a first control circuit 112*a* in the sub-pixel 110*a*. A second driving current is provided to a second light emitting element 114*b* in the sub-pixel 110*b* by a second control circuit 112*b* in the sub-pixel 110*b*. A third driving current is provided to a third light emitting element 114*c* in the sub-pixel 110*c* by a third control circuit 112*c* in the sub-pixel 110*c*.

In step S120, pulse amplitudes of the first driving current and the second driving current are controlled differently, such that the first light emitting element and the second light emitting element emit at a target wavelength.

Figure 9C:
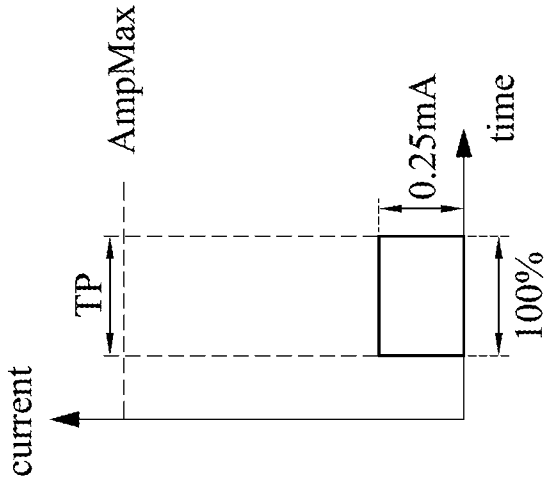
FIG. 9A-9C are schematic diagrams of waveforms of driving currents of sub-pixels in accordance with the embodiment of FIG. 7.
Figure 9B:
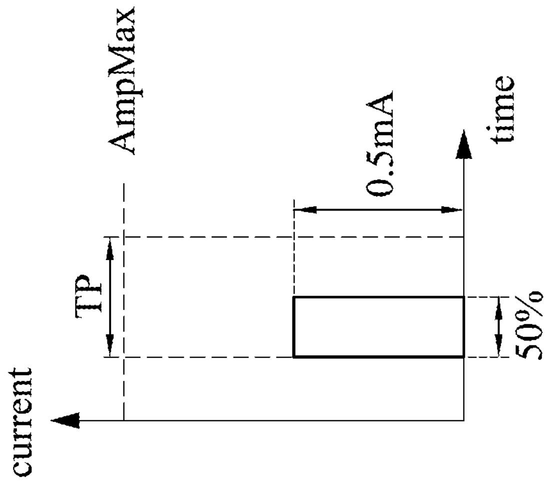
Figure 9A:
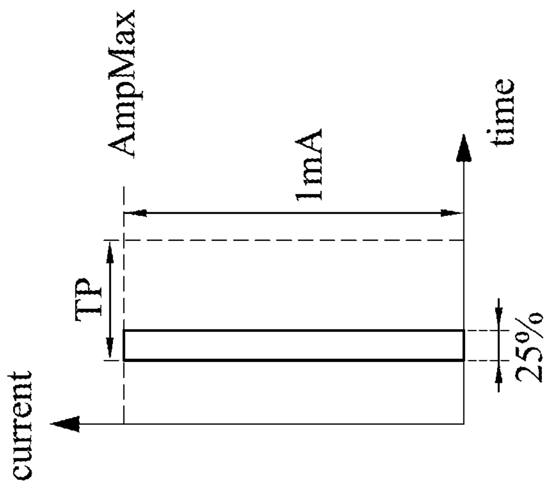

For better understanding, how to differently control the pulse amplitude of the first driving current and the pulse amplitude of the second driving current, reference is also made to FIG. 9A to FIG. 9C. FIG. 9A-9C are schematic diagrams of waveforms of driving currents of sub-pixels 110*a*, 110*b*, 110*c* in accordance with the embodiment of FIG. 7.

In step S122, pulse amplitude of the first driving current is set, such that the first light emitting element emits at the target wavelength. For example, the first driving current flowing through the first light emitting element 114*a* in the sub-pixels 110*a* is set/adjust from 0.25 mA to 1 mA, such that the peak wavelength, 519 nm, of the first light emitting element 114*a* in the sub-pixels 110*a* can be adjusted to the target wavelength, 513 nm, as point A' shown in FIG. 7.

In step S124, pulse amplitude of the second driving current is set, such that the second light emitting element emits at the target wavelength. For example, the second driving current flowing through the second light emitting element 114*b* in the sub-pixels 110*b* is set/adjust from 0.25 mA to 0.5 mA, such that the peak wavelength, 516 nm, of the second light emitting element 114*b* in the sub-pixels 110*b* can be adjusted to the target wavelength, 513 nm, as point B' shown in FIG. 7.

Since the peak wavelength of the third light emitting element 114*c* driven by the third driving current, in the sub-pixels 110*c*, is considered as the target wavelength (such as 513 nm) for the example, the third driving current provided to the third light emitting element 114*c* in the sub-pixels 110*c* does not need to be adjusted.

Since the adjustment of the pulse amplitudes of the driving currents in step S120 will change the gray levels of the sub pixels 110*a* and 110*b*, in the following step S130 will describe how to adjust duty ratio of the light emitting element of each sub-pixels 110*a*, 110*b* and 110*c* in the emission period TP, in order to control the gray levels of the adjacent sub-pixels 110*a*, 110*b* and 110*c*, with the same target wavelength, by the persistence of human vision. And, since the duty ratio of the light emitting element in the emission period TP can be determined as the pulse width of the driving current, the wavelength of the light emitting element will not be changed by adjusting the duty ratio of the light emitting element. That is, the wavelength of the light emitting element can be maintained at constant even the pulse width of the driving current is adjusted.

In the following embodiment, gray levels of the sub-pixels 110*a*, 110*b* and 110*c* are adjusted to the same for example. And, since the driving current flowing through the light emitting element 114*c* in the sub-pixels 110*c* has the minimum value (0.25 mA), the duty ratio of the third light emitting element 114*c* in the sub-pixels 110*c* is set at 100% for example. That is, the reference values of the maximum brightness of the sub-pixels 110*a*, 110*b* and 110*c* can be considered as the pulse amplitude of the third driving current flowing through the light emitting element in the sub-pixels 110*c* multiplied by the pulse width thereof (that is, pulse amplitude, 0.25 mA, multiplied by the duty ratio, 100%), as shown in FIG. 9C.

After step S120, step S130 is performed. In step S130, gray levels of the first light emitting element and the second light emitting element are adjusted. In some embodiments, step S130 includes step S132 and 134, as shown in FIG. 8B.

In step S132, pulse width of the first driving current is controlled, according to the pulse amplitude of the first driving current, to adjust the gray level of the first light emitting element. For example, since the first driving current have pulse amplitude AmpMax, 1 mA, the pulse width of the first driving current is set to the duty ratio of 25%. As a result, the gray level of the first light emitting element 114*a* can be adjusted to the same with the gray level of third light emitting element 114*c*, as shown in FIG. 9A.

In step S134, pulse width of the second driving current is controlled, according to the pulse amplitude of the second driving current, to adjust the gray level of the second light emitting element. For example, since the second driving current have pulse amplitude, 0.5 mA, the pulse width of the first driving current is set to the duty ratio of 50%. As a result, the gray level of the second light emitting element 114*b* can be adjusted to the same with the gray level of third light emitting element 114*c*, as shown in FIG. 9B.

In some embodiments, the first light emitting element 114*a* and the second light emitting element 114*b* can emit at a color point range (e.g. +/−1.5~2 nm) be performing step S110~S130. The operation is similar with the aforesaid manner, and the description is omitted. The color difference of the wavelength variation in the aforesaid color point range is not perceivably by human visual, and therefore the emission colors of the first light emitting element 114*a* and the second light emitting element 114*b* are adjusted to within the aforesaid color point range can decrease the color difference between the light emitting elements, so as to improve the display image.

In some embodiments, when the pulse amplitude of the first driving current and the pulse amplitude of the second driving current are at the test value, and the differences between the peak wavelengths of the first light emitting element and the second light emitting element is less than 15 nm, the aforesaid steps S110~S130 can be performed to control the first light emitting element 114*a* and the second light emitting element 114*b* emit at the target wavelength or the color point range.

To be noted that, in order to control the light emitting elements in the sub-pixels 110*a*, 110*b* and 110*c* to emit at the same target wavelength, the pulse amplitude of the driving current of each light emitting elements in the sub-pixels 110*a*, 110*b* and 110*c* can be maintained, and the pulse width of the driving current of each light emitting elements in the sub-pixels 110*a*, 110*b* and 110*c* can be controlled to display at different gray levels.

In some embodiments, the pulse amplitude of the driving current in each of the sub-pixels 110 can be set, before the display panel leaves the factory, to maintain at a constant value and to improve the color fidelity, and the pulse width of the driving current in each of the sub-pixels 110 can be controlled, according to lookup table, to display at the corresponding gray level.

Figure 10:
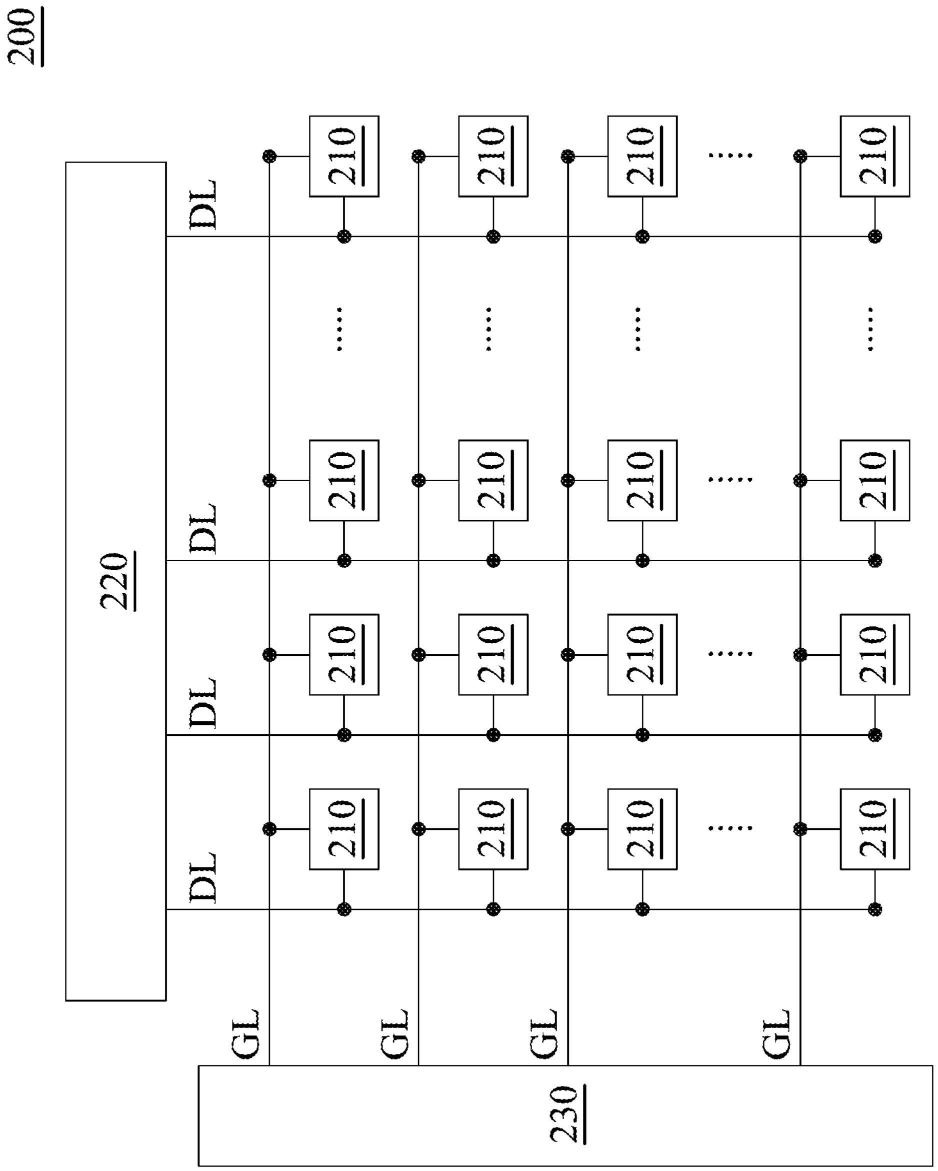
FIG. 10 is a schematic diagram of a display device in accordance with another embodiment of the present disclosure.

In the other embodiment, reference is made to FIG. 10. FIG. 10 is a schematic diagram of a display device 200 in accordance with another embodiment of the present disclosure. The display device 200 includes a gate driver 230, a data driver 220, multiple of pixels 210, multiple of data lines DL and multiple of gate lines GL. The gate driver 230 is electrically coupled to the gate lines GL. The data driver 220 is electrically coupled to the data lines DL. The pixels 210 positioned in the same column are electrically coupled to the data driver 220 through the data lines DL, respectively. The pixels 210 positioned in the same row are electrically coupled to the gate driver 230 through the gate lines GL, respectively. The pixels 210 can be realized as multiple of light emitting diode pixels.

Reference is made to FIG. 2 and FIG. 10. In some embodiments, each of the pixels 210 can be implemented by the light emitting diode package 110M. Although FIG. 2 only illustrate one light emitting element 114 for example, one light emitting diode package 110M can includes more the light emitting elements. For example, three light emitting elements can disposed in one light emitting diode package 110M, and the three light emitting elements can be red, green and blue light emitting diode chip, so as to implement the light emitting element in each of the red sub pixel, green sub pixel and blue sub pixel adjacent to each other in the pixels 210.

In some embodiments, the light emitting diode package 110M further include single control circuit (not shown in FIG. 2) to control the light emitting elements in the red sub pixel, green sub pixel and blue sub pixel adjacent to each other in the pixels 210. In other embodiment, the single control circuit, which is configured to control the light emitting element 114 of the red sub pixel, green sub pixel and blue sub pixel adjacent to each other in the pixels 210, is disposed outside the light emitting diode package 110M.

Reference is made to FIG. 3 and FIG. 10. In the other embodiment, the light emitting elements and control circuits in the pixels 210 can be implemented by the light emitting diode package 110N. Although FIG. 3 only illustrate two light emitting elements, in some embodiment, one light emitting diode package 110N can includes more light emitting elements. For example, one control circuit and three light emitting elements can be disposed in one light emitting diode package 110N. The three light emitting elements can be red, green and blue light emitting diode chip. However, it is not intend to limit the disclosure. In some embodiment, 6, 9 or more group of red, green and blue light emitting diode chip can be packaged together.

Figure 11:
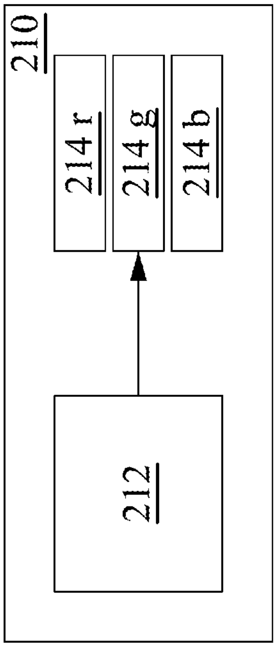
FIG. 11 is a functional block diagram of one of pixels in the display device in FIG. 10 in accordance with some embodiments of the present disclosure.

Reference is made to FIG. 11. FIG. 11 is a functional block diagram of one of pixels 210 in the display device 200 in FIG. 10 in accordance with some embodiments of the present disclosure. As shown in FIG. 11, one of the pixels 210 includes a control circuit 212 and light emitting elements 214_*r*, 214_*g* and 214_*b*. The control circuit 212 is electrically to the light emitting elements 214_*r*, 214_*g* and 214_*b*, and the control circuit 212 is configured to drive the light emitting elements 214_*r*, 214_*g* and 214_*b* to emit light. In some embodiments, at least one of the pixels 210 includes the control circuit 212 and the light emitting elements 214_*r*, 214_*g* and 214_*b*. In other embodiments, each of the pixels 210 includes the control circuit 212 and the light emitting elements 214_*r*, 214_*g* and 214_*b*. Compare to FIG. 4, the light emitting elements 214_*r*, 214_*g* and 214_*b* in one of the pixels 210 in FIG. 11 are controlled by one control circuit 212. The control circuit 212 can be realized as micro driver chip, the control circuit 212 has a size range from 1 micrometer to 300 micrometers. Furthermore, the aforesaid micro driver chip has a size, such as 10, 30, 50, 70, 100, 120, 150, 200 or 250 micrometers. The light emitting element 214_*r*, 214_*g* and 214*b* in FIG. 11 are similar to the light emitting element 114 in FIG. 4, and the description is omitted.

The light emitting element 214_*r*, 214_*g* and 214_*b* can be realized as the light emitting elements in each of the red sub pixel, the green sub pixel and the blue sub pixel. The control circuit 212 is configured to provide the corresponding driving currents to the light emitting element 214_*r*, 214_*g* and 214_*b*, to drive the light emitting element 214_*r*, 214_*g*, and 214_*b* to emit lights.

Figure 12B:
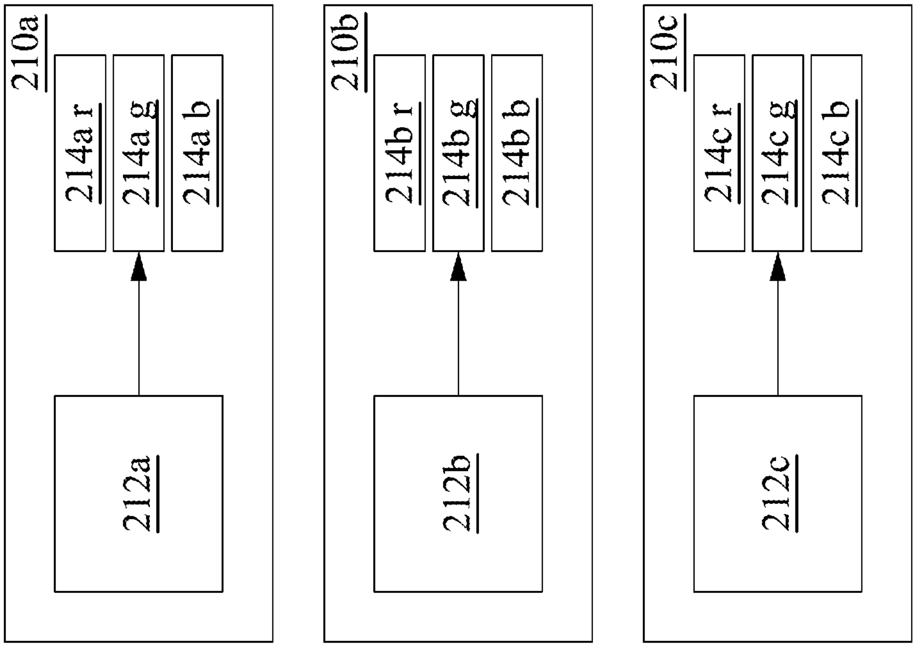
FIG. 12B is a functional block diagram of the pixels in FIG. 12A in accordance with some embodiments of the present disclosure.
Figure 12A:
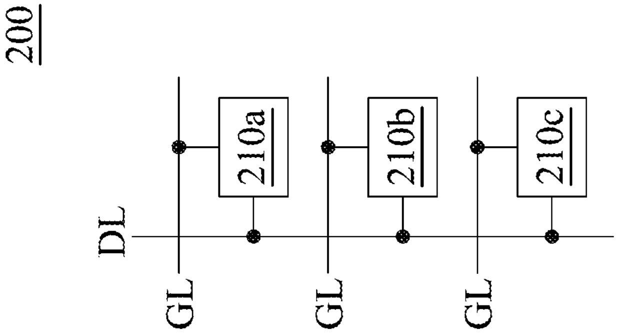
FIG. 12A is a schematic diagram of adjacent pixels in the display device in FIG. 10 in accordance with some embodiments of the present disclosure.

FIG. 12A is a schematic diagram of adjacent pixels in the display device 200 in FIG. 10 in accordance with some embodiments of the present disclosure. The pixels 210*a*, 210*b* and 210*c* can be indicated to the pixels 210 in FIG. 11, and the pixels 210*a*, 210*b* and 210*c* can be indicated to any adjacent pixels in the display device 200.

Reference is also made to FIG. 12B. FIG. 12B is a functional block diagram of the pixels in FIG. 12A in accordance with some embodiments of the present disclosure. As shown in FIG. 12B, the pixel 210*a* includes a first control circuit 212*a* and a first light emitting element 214*a*_r, 214*a*_g and 214*a*_b. The first control circuit 212*a* is configured to provide the corresponding driving currents to the first light emitting elements 214*a*_r, 214*a*_g and 214*a*_b.

The pixel 210*b* includes a second control circuit 212*b* and a second light emitting element 214*b*_r, 214*b*_g and 214*b*_b. The second control circuit 212*b* is configured to provide the corresponding driving currents to the second light emitting elements 214*b*_r, 214*b*_g and 214*b*_b.

The pixel 210*c* includes a third control circuit 212*c* and a third light emitting element 214*c*_r, 214*c*_g and 214*c*_b. The third control circuit 212*c* is configured to provide the corresponding driving currents to the third light emitting elements 214*c*_r, 214*c*_g and 214*c*_b.

The first light emitting element 214*a*_r, the second light emitting element 214*b*_r and the third light emitting element 214*c*_r can be realized as the light emitting elements of red sub pixels in the pixels 210*a*, 210*b* and 210*c*. The first light emitting element 214*a*_g, the second light emitting element 214*b*_g and the third light emitting element 214*c*_g can be realized as the light emitting elements of green sub pixels in the pixels 210*a*, 210*b* and 210*c*. The first light emitting element 214*a*_b, the second light emitting element 214*b*_b and the third light emitting element 214*c*_b can be realized as the light emitting elements of blue sub pixels in the pixels 210*a*, 210*b* and 210*c*.

Figure 13:
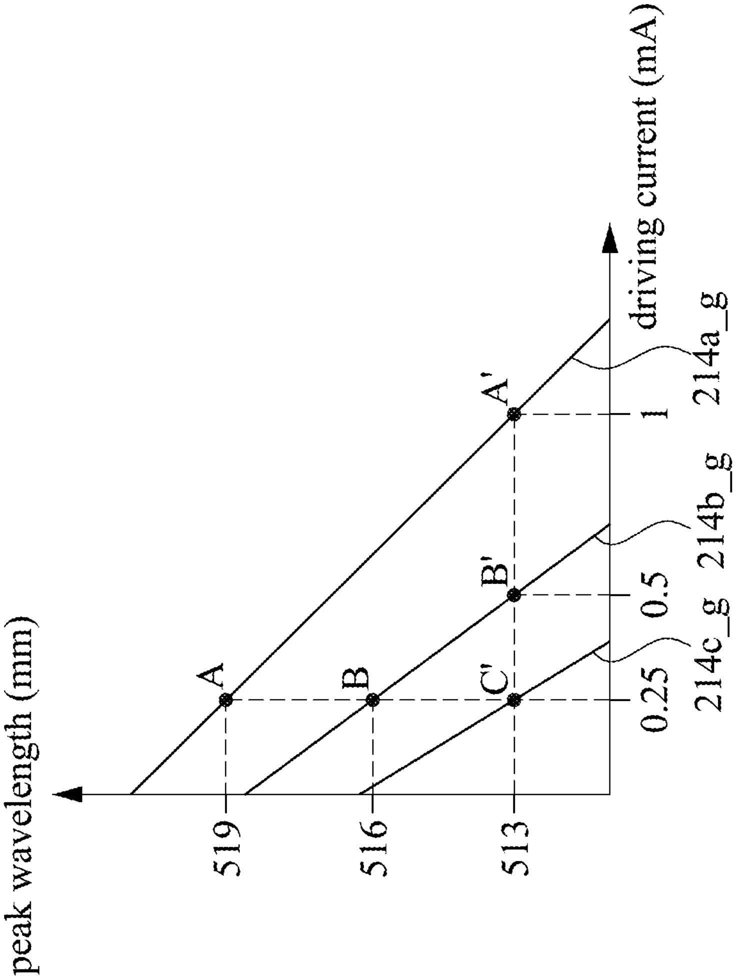
FIG. 13 is a schematic diagram of a graph of peak wavelength over driving current for the light emitting elements in same color sub-pixels in the pixels of FIG. 12B in accordance with some embodiments of the present disclosure.

Reference is made to FIG. 13. FIG. 13 is a schematic diagram of a graph of peak wavelength over driving current for the light emitting elements in same color sub-pixels in the pixels 210*a*, 210*b* and 210*c* of FIG. 12B in accordance with some embodiments of the present disclosure. For example, when the driving currents, such as 0.25 mA are applied to the light emitting elements (such as the first light emitting element 214*a*_g, the second light emitting element 214*b*_g and the third light emitting element 214*c*_g) of each green sub pixels in the pixels 210*a*, 210*b* and 210*c*, the peak wavelengths of the first light emitting element 214*a*_g, the second light emitting element 214*b*_g and the third light emitting element 214*c*_g are respectively 519 nm, 516 nm and 513 nm.

The operations to adjust the peak wavelengths of the light emitting elements of each green sub pixels in the pixels 210*a*, 210*b* and 210*c* to the target wavelength are similar with the aforesaid embodiment of FIG. 7 and steps S110-S130, and the description is omitted.

Summary, the disclosure is to control the pulse amplitude of the driving current provided for the light emitting element, such that the light emitting element can emit at the target wavelength, and to control the pulse width of the driving current provided for the light emitting element to change the gray level of the light emitting element, in order to increase the utilization rate, which may reduce the manufacturing cost, and to improve the color fidelity and decrease the color deviation of the display.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A display device, wherein the display device comprises a plurality of sub-pixels, the sub-pixels comprising:

a first sub-pixel, wherein the first sub-pixel comprising:

a first light emitting element, with a first peak wavelength; and a first control circuit, coupled with the first light emitting element, wherein the first control circuit is configured to provide a first driving current with a first pulse amplitude to the first light emitting element, wherein the first pulse amplitude is set to adjust the first peak wavelength of the first light emitting element toward a target wavelength; and a second sub-pixel, wherein the first sub-pixel and the second sub-pixel are the same color sub-pixels, wherein the second sub-pixel comprising:

a second light emitting element, with a second peak wavelength different from the first peak wavelength; and a second control circuit, coupled with the second light emitting element, wherein the second control circuit is configured to provide a second driving current with a second pulse amplitude to the second light emitting element, wherein the second pulse amplitude is set to be different from the first pulse amplitude to adjust the second peak wavelength of the second light emitting element toward the target wavelength, such that both of the first light emitting element and the second light emitting element emit at the target wavelength or a color point range.

2. The display device of claim 1, wherein the second pulse amplitude of the second driving current is different from the first pulse amplitude of the first driving current.

3. The display device of claim 2, wherein difference between the first peak wavelength of the first light emitting element and the second peak wavelength of the second light emitting element is equal or less than 15 nm.

4. The display device of claim 1, wherein the first control circuit is further configured to control pulse width of the first driving current, according to the first pulse amplitude of the first driving current, to adjust gray level of the first light emitting element, and wherein the second control circuit is further configured to control pulse width of the second driving current, according to the second pulse amplitude of the second driving current, to adjust gray level of the second light emitting element.

5. The display device of claim 1, further comprising:

a plurality of data lines, wherein each of the data lines is electrically coupled to the sub-pixels in same column;

a plurality of gate lines, wherein each of the gate lines is electrically coupled to the sub-pixels in same row;

a data driver, electrically coupled to the data lines; and a gate driver, electrically coupled to the gate lines.

6. The display device of claim 1, wherein light emitting element of each of the sub-pixels is transmitted from micro light emitting diode wafer.

7. A display device, wherein the display device comprises a plurality of pixels, wherein one of the pixels comprises a first control circuit and a first sub-pixel, wherein the first sub-pixel comprises first light emitting element with a first peak wavelength, wherein the first control circuit is coupled with the first light emitting element, wherein another of the pixels comprises a second control circuit and a second sub-pixel, wherein the first sub-pixel and the second sub-pixel are the same color sub-pixels, wherein the second sub-pixel comprises a second light emitting element with a second peak wavelength different from the first peak wavelength, wherein the second control circuit is coupled with the second light emitting element, and wherein:

the first control circuit is configured to provide a first driving current with a first pulse amplitude to the first light emitting element, wherein the first pulse amplitude is set to adjust the first peak wavelength of the first light emitting element toward a target wavelength; and the second control circuit is configured to provide a second driving current with a second pulse amplitude to the second light emitting element, wherein the second pulse amplitude is set to be different from the first pulse amplitude to adjust the second peak wavelength of the second light emitting element toward the target wavelength, such that the first light emitting element and the second light emitting element emit at the target wavelength or a color point range.

8. A driving method for operating a display device, wherein the display device comprises a plurality of sub-pixels, wherein the sub-pixels comprise a first sub-pixel and a second sub-pixel, wherein the first sub-pixel and the second sub-pixel are the same color sub-pixels, wherein the first sub-pixel comprises a first light emitting element with a first peak wavelength, wherein the second sub-pixel comprises a second light emitting element with a second peak wavelength different from the first peak wavelength, wherein the driving method comprising:

providing a first driving current with a first pulse amplitude to the first light emitting element, wherein the first pulse amplitude is set to adjust the first peak wavelength of the first light emitting element toward a target wavelength; and providing a second driving current with a second pulse amplitude to the second light emitting element, wherein the second pulse amplitude is set to be different from the first pulse amplitude to adjust the second peak wavelength of the second light emitting element toward the target wavelength, such that both of the first light emitting element and the second light emitting element emit at the target wavelength or in a color point range.

9. The driving method of claim 8, wherein the second pulse amplitude of the second driving current is different from the first pulse amplitude of the first driving current.

10. The driving method of claim 8, further comprising:

controlling pulse width of the first driving current, according to the first pulse amplitude of the first driving current, to adjust gray level of the first light emitting element; and controlling pulse width of the second driving current, according to the second pulse amplitude of the second driving current, to adjust gray level of the second light emitting element.

* * * * *